United States Patent [19]
Desai et al.

[11] Patent Number: 5,443,722
[45] Date of Patent: Aug. 22, 1995

[54] DUPLEX STRAINER

[75] Inventors: Ashvin D. Desai; Robert Whritenour, both of Lumberton, N.C.

[73] Assignee: Mueller Steam Specialty, St. Pauls, N.C.

[21] Appl. No.: 252,092

[22] Filed: Jun. 1, 1994

[51] Int. Cl.$^6$ .............................................. B01D 29/27
[52] U.S. Cl. .................... 210/253; 210/340; 210/420; 210/452; 210/470; 137/625.21; 137/625.43; 55/343; 55/344; 55/484
[58] Field of Search .............. 137/597, 624.13, 625, 137/625.15, 625.17, 625.21, 625.43, 625.46; 55/343, 344, 484; 210/253, 335, 340, 341, 405, 418, 420, 421, 422, 424, 448, 452, 470

[56] References Cited

U.S. PATENT DOCUMENTS

| | | | |
|---|---|---|---|
| 3,679,060 | 7/1972 | Smith | 210/340 |
| 4,274,445 | 6/1981 | Cooper | 210/340 |
| 4,496,463 | 1/1985 | Desai et al. | 210/341 |
| 4,606,820 | 8/1986 | Rea et al. | 210/424 |
| 4,921,598 | 5/1990 | Desch | 210/340 |

*Primary Examiner*—Robert A. Dawson
*Assistant Examiner*—W. L. Walker
*Attorney, Agent, or Firm*—Stroock & Stroock & Lavan

[57] ABSTRACT

A duplex strainer for straining material includes a housing, housing inlet port through which material enters the housing under pressure for straining and an outlet port through which strained material exits the housing. The housing includes a first strainer chamber having the first and second ports in separate fluid communication with the housing. A second strainer chamber includes third and fourth ports in separate fluid communication with the housing. The first port opposes the third port and the second port opposes the fourth port. A valve control structure includes a first three-way ball valve disposed within the housing for controlling fluid flow between the first port, third port and the housing. A second three-way ball valve is disposed within the housing to control fluid flow between the housing, second port and fourth port.

6 Claims, 4 Drawing Sheets

DUPLEX STRAINER

BACKGROUND OF THE INVENTION

The present invention is directed to a duplex strainer and, in particular, to a duplex strainer having an improved flow diverter mechanism.

Duplex strainers have been developed in order to permit continuous straining and cleaning of a flow. Duplex strainers generally include two strainer chambers and some type of mechanism for diverting the flow from one chamber to the other to permit cleaning, servicing or repairing of one chamber while the other one is in use. This permits the flow through the duplex strainer to remain continuous.

One such duplex strainer is known in the art described in U.S. Pat. No. 4,496,463 which includes a unitary housing with an inlet port and an outlet port. A first and second strainer chamber, each having first and second ports, are in separate fluid communication with the housing. A scotch yoke design converts rotation of a first shaft into reciprocal lateral displacement of first and second disc assemblies to permit either the first or second strainer chamber to be closed off to flow while the other of the first or second strainer chambers remain open to flow.

Another design of the duplex strainer consists of two cylindrical plugs or one tapper plug as transfer valve and having one piece body casting. Such a duplex strainer has been satisfactory for its intended application, however, it suffers from the disadvantages that the casting of a unitary piece body is difficult. Furthermore, it is difficult to effect a tight seal with the sleeve and it was impossible to perform in-line repairs upon the strainer. Accordingly, it is desired to provide an improved duplex strainer which overcomes the disadvantages of the prior art design.

SUMMARY OF THE INVENTION

Generally speaking, in accordance with the present invention, a duplex strainer for straining a material such as a liquid, steam or gas flowing through the strainer, is provided. The strainer includes a housing having an inlet port through which the material enters the housing under pressure for straining and an outlet port through which the strained material exits the housing. The housing includes a first strainer chamber having first and second ports in separate fluid communication with the housing. A second strainer chamber mounted to said housing including third and fourth ports in separate fluid communication with the housing. The first port opposes the third port, and the second port opposes the fourth port.

A first three-way ball valve is disposed within the housing for controlling communication between the housing first port and third port. A second three-way ball valve is disposed within the housing to control fluid communications between the housing, second port and fourth port. A shaft couples the first three-way ball valve to the second three-way ball valve so that the two move in unison, rotation of the three-way ball valve controls flow of the material into the first chamber and the second chamber.

Accordingly, it is the object of the present invention to provide an improved duplex strainer.

Another object of the present invention is to provide a duplex strainer having an improved mechanism for effecting flow diversion.

Yet another object of the invention is to provide a duplex strainer which includes a field replaceable seat design so that the strainer body stays in line and does not need to be removed.

A further object of the invention is to provide a duplex strainer which eliminates the need of a shut-off valve upstream of the strainer.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENT

Figure 1:
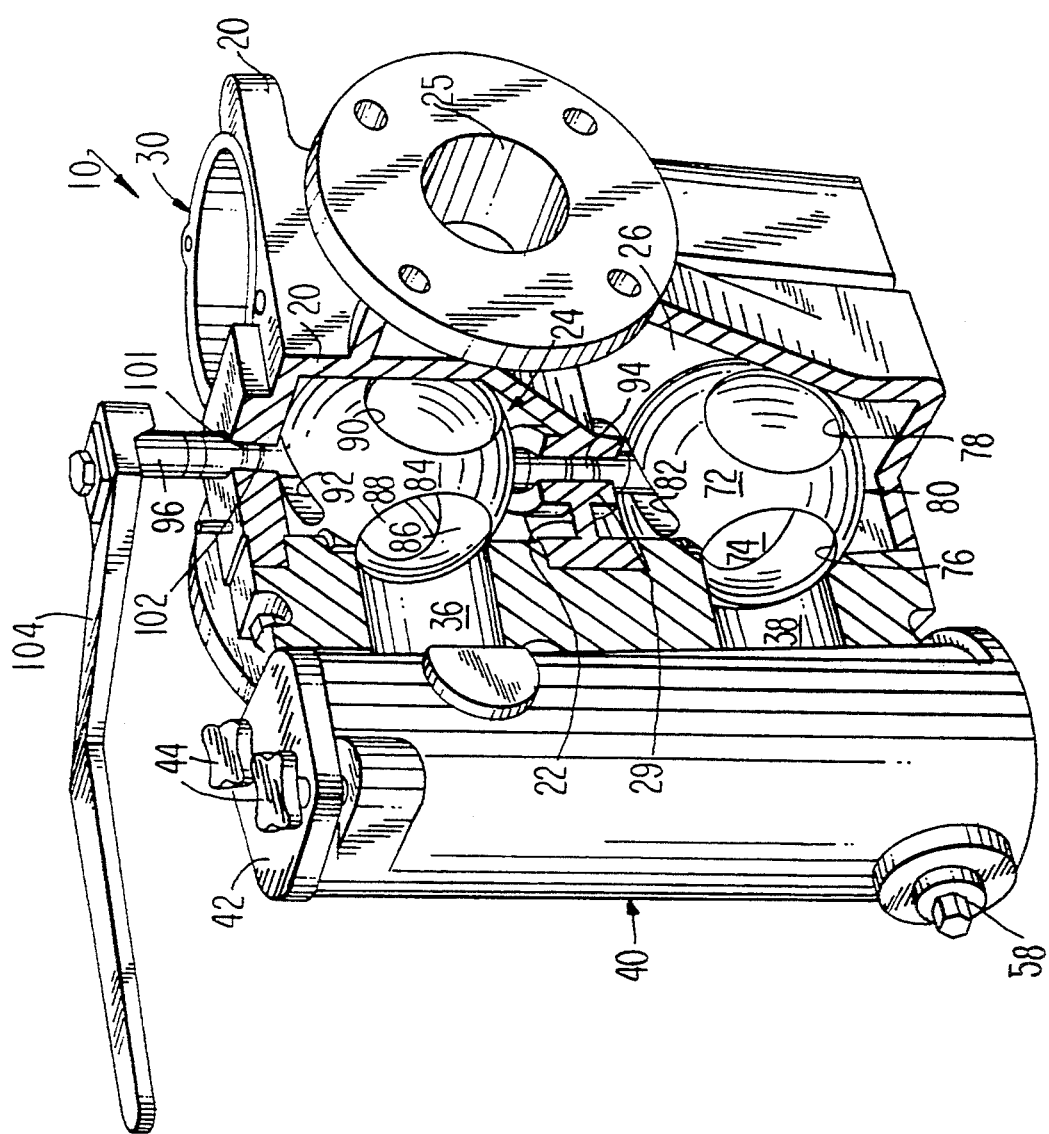
FIG. 1 is a partial sectional perspective view of a duplex strainer constructed in accordance with the invention.
Figure 2:
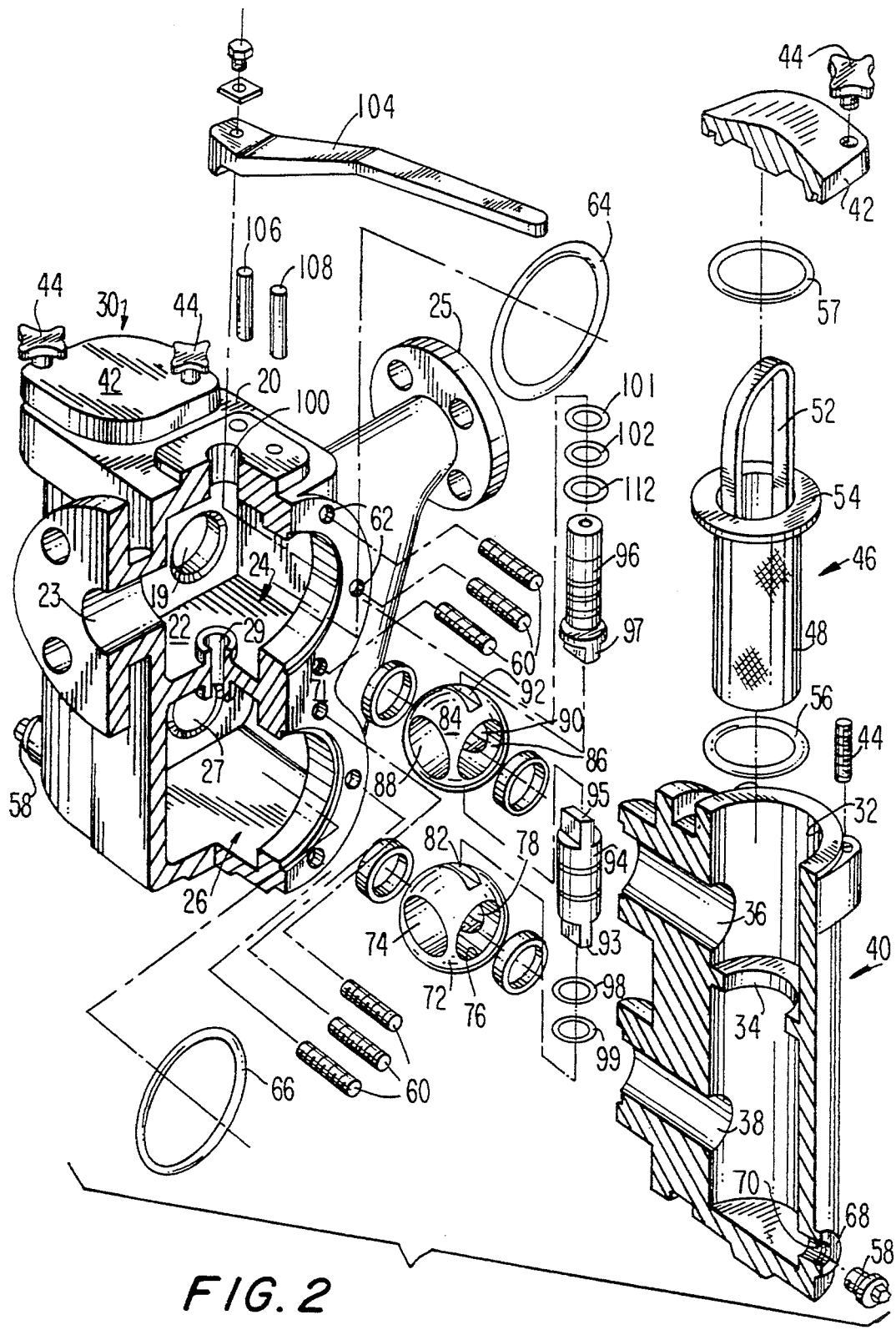
FIG. 2 is an exploded view of part of the duplex strainer constructed in accordance with the invention.

Reference is first made to FIGS. 1 and 2 which depict a duplex strainer, generally indicated at 10, constructed in accordance with the invention. Duplex strainer 10 includes a housing 20, a first straining chamber assembly 30 formed in housing 20, and a second straining chamber assembly 40 coupled to housing 20. The valve assembly, generally indicated at 80, is disposed within housing 20 and controls fluid flow between housing 20 and each of straining chamber assemblies 30, 40.

As can be seen more clearly in FIG. 2, housing 20 is divided by a divider 22 into an upper chamber 24 and a lower chamber 26. A channel 29 extends through divider 22. A system entrance port 23 communicates with upper chamber 24 to provide an input for fluids into housing 20. Similarly, a system exit port 25 communicates with lower chamber 26 to allow fluids to exit from housing 20. A straining chamber assembly entrance port 19 provides fluid communication between straining chamber assembly 30 and upper chamber 24. A straining chamber assembly exit port 27 provides fluid communication between straining chamber assembly 30 and lower chamber 26, so that a fluid, unless prevented by valve assembly 80, flows into housing 20 through system entrance port 23, then into straining chamber assembly 30, through straining chamber 30 and into lower chamber 26 through straining chamber assembly exit port 27. The overall flow of fluid through straining chamber assembly 30 is in a substantially C-shaped pattern.

Reference is now made to strainer basket assembly 40 which will be described in detail, strainer basket assembly 30 not shown in detail being substantially a mirror image of strainer basket assembly 40, the primary difference being that strainer basket assembly 30 forms a unitary member with housing 20, while strainer basket assembly 40 is attached to housing 20 and will be discussed in detail below. Strainer basket assembly 40 includes a straining chamber 32 therein. A flange 34 extends entirely about the inner diameter of straining chamber 32, extending towards the center of straining chamber 32 to form a lip therein, dividing straining chamber 32 into an upper portion and a lower portion. An entry port 36 is provided at the upper portion of straining chamber 32 providing fluid communication between upper chamber 24 of housing 20 and straining chamber 32. Similarly, exit port 38 provides fluid communication between the lower portion of straining chamber 32 and lower chamber 26 of housing 20. A releasable cover 42 is mounted to straining chamber 32 by a stud and knob 44 to maintain straining chamber 40 in a sealed condition during operation. An O-ring 57 is disposed between cover 42 and straining chamber 32 to prevent fluid leakage during straining.

A basket, generally indicated at 46, is dimensioned to be received within straining chamber 32. Basket 46 includes a strainer 48. A flange 54 extends from the top of strainer 48. Flange 54 is dimensioned to rest on flange 34 within straining chamber 32. Basket 46 also includes the handle 52 for removal of basket 46 to allow the removal of strained material trapped within strainer 48 as will be discussed in detail below. An O-ring 56 is disposed between flanges 34 and 54 to prevent the leakage of unstrained fluid into the lower portion of straining chamber 32. In an exemplary embodiment, straining chamber 32 is provided with a drain 68, having a threaded inner surface 70. A threaded plug 58 releasable seals drain 68 to allow drainage of straining chamber 32 as needed.

A plurality of bolt holes 62 are formed in a face 71 of housing 20. Strainer basket assembly 40 is mounted to housing 20 by a plurality of bolts 60 releasable secured in bolt holes 62 and corresponding bolt holes (not shown) formed adjacent exit and entrance ports 38, 36 of strainer basket assembly 40. When attached, entrance port 36 provides a fluid pathway between straining chamber 32 and upper chamber 24 of housing 20. Similarly, exit port 38 provides a liquid path between straining chamber 32 and lower chamber 26 of housing 20. The liquid flow path is substantially C-shaped, exiting housing 20 through entrance port 36, down through straining chamber 32, and basket 46, and returning to housing 20 through exit port 38. An O-ring 64 is disposed between housing 20 and entrance port 36, and a second O-ring 66 is disposed between housing 20 and exit port 38 to provide a tight seal between the housing 20 and straining basket assembly 40 to prevent leakage.

The flow of fluid between housing 20 and strainer basket assemblies 30, 40 is controlled by valve assembly 80. Valve assembly 80 includes a first three-way ball valve 72 rotatably disposed within lower chamber 26. Three-way ball valve 72 has three openings, 74, 76, 78, all of which communicate with each other so that a fluid may pass from any one opening to any one of the other openings through three-way ball valve 72. A notch 82 is formed in a surface of three-way ball valve 72. Three-way ball valve 72 rotatably sits within lower chamber 26 so that any one of openings 74, 76 and 78 may be aligned with straining chamber exit port 27 or strainer chamber exit port 38. Notch 82 is positioned substantially coaxially with channel 29.

A second three-way ball valve 84 rotatably sits in upper chamber 24. Like three-way ball valve 72, three-way ball valve 84 has three openings, 86, 88 and 90 in fluid communication with each other. A notch 92 is formed on one side of ball valve 84 and a second notch 110 (FIG. 4) is formed on the opposed side of three-way ball valve 84. Openings 86, 88 and 90 are disposed so that any one of them may be placed in fluid communication with straining chamber entrance port 19 and straining chamber entrance port 36.

A shaft 94 is rotatably disposed within channel 29. O-rings 98, 99 are disposed about shaft 94 to prevent fluid flow within channel 29. Shaft 94 includes a first flange 95 received by a notch 110 in three-way ball valve 84. A second flange 93 formed on the opposed end of shaft 94 and is received within shaft 82 so that rotation of shaft 94 causes three-way ball valve 72 and 84 to rotate in unison. A second shaft 96 is rotatably mounted within a second channel 100 formed within housing 20. O-rings 101, 102 are mounted about shaft 96 to prevent fluid flow through channel 100. A flange 97 is formed on shaft 96 and is received by notch 92 in three-way ball valve 84, so that rotation of shaft 96 causes rotation of three-way ball valve 84 and, in turn, three-way ball valve 72. As a result any opening in each respective three way valve may be brought in alignment with either exit port (valve 72) or entrance port (valve 84).

Shaft 96 extends through housing 20. A handle 104 is mounted on shaft 96 to facilitate rotating shaft 96 and in turn three-way ball valves 72, 84 in a desired indexed position. Pegs 106, 108 extend from housing adjacent handle 104 and to stop rotation of handle 104 when valves 72, 84 are in a desired orientation relative to the various exit and entrance ports preventing overrotation of valves 72 and 84.

Figure 4:
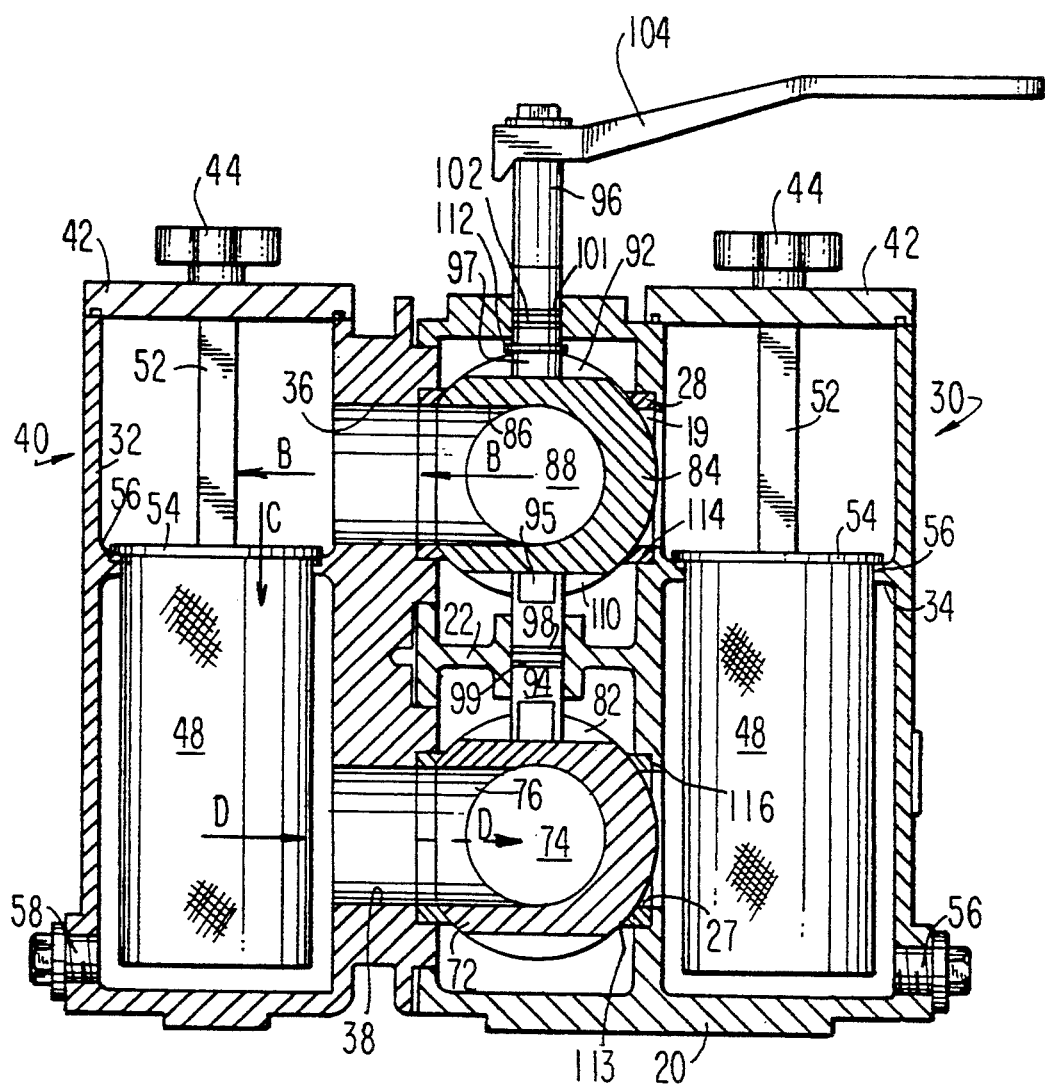
FIG. 4 is a sectional view taken along line 4—4 of FIG. 3.

Reference is made to FIG. 4 wherein three-way ball valve 84 is seated between a left seat 28 and a right seat 114. The second three-way ball valve 72 is seated between an left seat 116 and a right seat 112. Removal of chamber assembly 40 allows on-site access to any one of seats 28, 112, 114 and 116.

Figure 3:
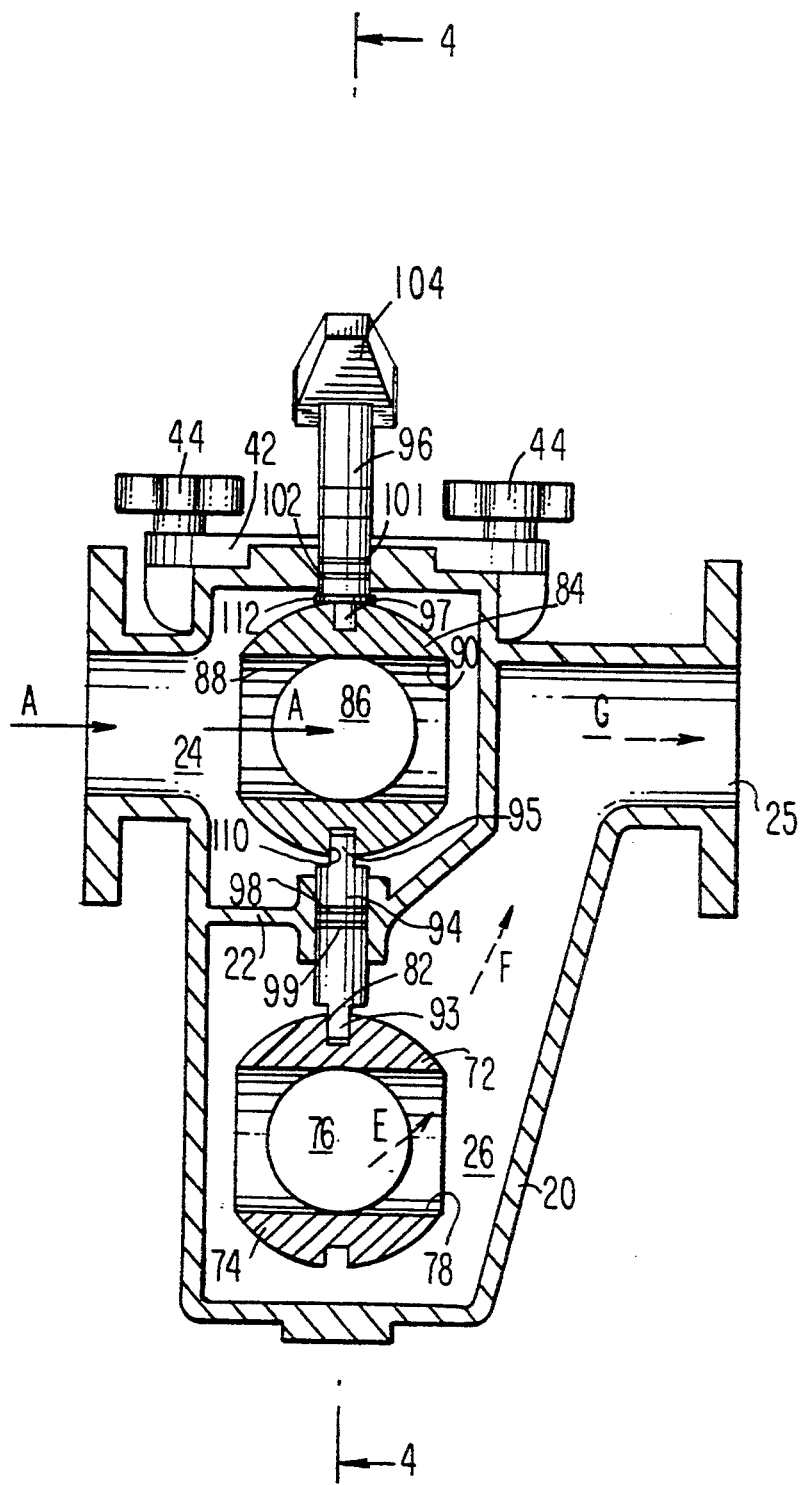
FIG. 3 is a sectional view of the Duplex strainer constructed in accordance with the invention, showing the liquid flow path therethrough.

Reference is made to FIGS. 1, 3 and 4 wherein a fluid flow pattern is illustrated. A fluid enters body 20 at entrance port 23 in the direction of arrows A (FIG. 3), and continues to flow in the direction of arrow A through an opening 88 of three-way ball valve 84. Fluid floods upper chamber 24 until it follows the path of least resistance through three-way ball valve 84 and out opening 86 in the direction of arrows B (FIG. 4). The fluid flows in the direction of arrows B through entrance port 36 of basket straining chamber 40. It flows in the direction of arrow C into basket 46 and through strainer 48 in the direction of arrows D. The fluid is strained by strainer 48 prior to exiting through exit port 38 into opening 76 of three-way ball valve 72. The fluid then exits three-way ball valve 72. The fluid exits three-way ball valve 72 through opening 78 in direction of arrow E (FIG. 3) and continues through lower chamber 26 in the direction of arrow F. The fluid flows in the direction of arrow G through exit 25, completing the flow path.

It should be noted, in the above example, three-way ball valves 72, 84 were positioned so that no opening of either of the three-way ball valves cooperated with entrance or exit ports of strainer basket assembly 30 (FIG. 4). Accordingly, the entire straining operation was performed by strainer basket assembly 40, allowing the removal of basket 48 from strainer basket assembly 30 without interfering with operation of the strainer. By isolating strainer basket assembly 30 access can be gained to basket 46, to empty basket 46 of strained materials, perform maintenance on chamber 32, or other tasks involving basket assembly 30 without interfering with operation of the entire system of duplex strainer 10.

It should be understood that by rotating handle 104 substantially 90° and thereby rotating three-way ball valves 72, 84, opening 88 will be brought in fluid communication with entrance port 19 simultaneously with opening 90 being brought in fluid communication with entrance port 36, so that the fluid will flow into both strainer basket assemblies, 30, 40 simultaneously to provide a dual straining function. At the same time, opening 74 will communicate with exit port 27 while opening 78 will communicate with exit port 38, providing a continuous flow path for both strainer basket assemblies 30, 40. Similarly, by rotating handle 104 substantially 180° from the position shown FIGS. 3 and 4, three-way ball valves 72, 84 will also be rotated 180° bringing opening 86 in fluid communication with entrance port 19 and opening 76 in fluid communication with exit port 27, isolating strainer basket assembly 40, preventing fluid from flowing therethrough to allow service access of strainer basket assembly 40 without interruption of a straining process.

By providing a duplex strainer in which at least one strainer basket assembly is bolted to the housing and not formed integrally therewith, the manufacture of duplex strainers is simplified. Furthermore, by providing a three-way ball valve as a flow transfer valve, leakage at low pressure is reduced, allowing the inlet of the strainer to be shut off, isolating the pump as well as other equipment, limiting the need of a shut-off valve upstream of the strainer. Furthermore, the use of a three-way ball valve allows field maintenance of the duplex strainer without interfering with a continuous straining function.

It will thus be seen that the objects set forth above, among those made apparent from the preceding description, are efficiently attained and, since certain changes may be made in the above construction without departing from the spirit and scope of the invention, it is intended that all matter contained in the above construction as shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A duplex strainer for straining a fluid comprising a housing having an inlet port through which material enters the housing and an outlet port through which strained material leaves the housing, a first strainer chamber for straining said fluid having first and second ports in separate fluid communication with the housing, a second strainer chamber for straining said fluid having a third port opposing said first port and a fourth port which opposes said second port in separate fluid communication with said housing, a first three-way ball valve for controlling the flow of fluid between said housing, first port and second port, and a second three-way ball valve for controlling the flow of fluid between said second port and said fourth port and a coupling for coupling said first three way ball valve to said second three-way ball valve, said coupling causing said first three-way ball valve and said second three-way ball valve to move in unison, causing fluid to flow either entirely through said first strainer chamber, entirely through said second strainer chamber, or through both said first strainer chamber and said second strainer chamber simultaneously.

2. The duplex strainer of claim 1, further comprising a divider disposed within said housing between said first three-way ball valve and said second three-way ball valve forming an upper chamber within said housing and a lower chamber within said housing, said first and third ports communicating solely with said upper chamber and said second and fourth ports communicating only with said lower chamber.

3. The duplex strainer of claim 1, wherein said first strainer chamber is formed unitarily with said housing and said second strainer chamber is detachably mounted to said housing.

4. A duplex strainer for straining a fluid comprising a housing having an inlet port through which material enters the housing and an outlet port through which strained material leaves the housing, a first strainer chamber for straining said fluid having first and second ports in separate fluid communication with the housing, a second strainer chamber for straining said fluid having a third port opposing said first port and a fourth port which opposes said second port in separate fluid communication with said housing, a valve control for controlling the flow of fluid within said housing and between said first port, second port, third port and fourth port, said valve control including a first three-way valve for controlling the flow of fluid between said housing, first port and second port, and a second three-way valve for controlling the flow of fluid between said second port and said fourth port and a coupling for coupling said first three way valve to said second three-way valve, said coupling causing said first three-way valve and said second three-way valve to move in unison, causing fluid to flow either entirely through said first strainer chamber, entirely through said second strainer chamber, or through both said first strainer chamber and said second chamber simultaneously, said coupling includes a first notch formed within said first three-way valve and a second notch formed within said second three-way valve, and a shaft, said shaft including a first flange and a second flange, said first flange being received within said first notch and said second flange being received within said second notch.

5. A duplex strainer for straining a fluid comprising a housing having an inlet port through which material enters the housing and an outlet port through which strained material leaves the housing, a first strainer chamber for straining said fluid having first and second ports in separate fluid communication with the housing, a valve control for controlling the flow of fluid within said housing and between said first port, second port, third port and fourth port, said valve control including a second strainer chamber for straining said fluid having a third port opposing said first port and a fourth port which opposes said second port in separate fluid communication with said housing, a first three-way valve for controlling the flow of fluid between said housing, first port and second port, and a second three-way valve for controlling the flow of fluid between said second port and said fourth port and a coupling for coupling said first three way valve to said second three-way valve, said coupling causing said first three-way valve and said second three-way valve to move in unison, causing fluid to flow either entirely through said first strainer chamber, entirely through said second strainer chamber, or through both said first strainer chamber and said second chamber simultaneously, said first stainer chamber being formed unitarily with said housing and said second strainer chamber being detachably mounted to said housing, a divider disposed within said housing forming an upper chamber within said housing and lower chamber within said housing, said coupling means including a first notch formed within said first three-way valve and a second notch formed within said second three-way valve, and a shaft, said shaft including a first flange and a second flange, said first flange being received within sad first notch and said second flange being received in said second notch, said shaft extending through said divider.

6. A duplex strainer for straining a fluid comprising a housing having an inlet port through which material enters the housing and an outlet port through which strained material leaves the housing, a first strainer chamber for straining said fluid having first and second ports in separate fluid communication with the housing, a second strainer chamber for straining said fluid having a third port opposing said first port and a fourth port which opposes said second port in separate fluid communication with said housing; a valve control for controlling the flow of fluid within said housing and between said first port, second port, third port and fourth port, said valve control including a first three-way ball valve for controlling the flow of fluid between said housing, first port and second port, and a second three-way ball valve for controlling the flow of fluid between said second port and said fourth port; a divider disposed within said housing between said first three-way ball valve and said second three-way ball valve forming an upper chamber within said housing and a lower chamber within said housing, said first and third ports communicating solely with said upper chamber and said second and fourth ports communicating only with said lower chamber; and a coupling for coupling said first three-way ball valve to said second three-way ball valve, said coupling causing said first three-way ball valve and said second three-way ball valve to move in unison, causing fluid to flow either entirely through said first strainer chamber, entirely through said second strainer chamber, or through both said first strainer chamber and said second strainer chamber; said first strainer chamber being formed unitarily with said housing and said second strainer chamber being detachably mounted to said housing.

* * * * *